United States Patent
Rutz et al.

[19]

[11] Patent Number: 6,036,465
[45] Date of Patent: Mar. 14, 2000

[54] APPARATUS FOR COOLING EXTRUDED MELT FILM

[75] Inventors: Andreas Rutz; Thomas Fischer, both of Lindau, Germany

[73] Assignee: Lindauer DORNIER Gesellschaft mbH, Lindau, Germany

[21] Appl. No.: 09/033,810

[22] Filed: Mar. 3, 1998

[30] Foreign Application Priority Data

Mar. 6, 1997 [DE] Germany ............. 197 09 138

[51] Int. Cl.$^7$ ................................. B29C 47/88
[52] U.S. Cl. ............. 425/71; 264/178 R; 425/378.1; 425/461
[58] Field of Search ................ 425/67, 70, 71, 425/378.1, 461; 264/178 R, 179, 180

[56] References Cited

U.S. PATENT DOCUMENTS

| | | | |
|---|---|---|---|
| 2,045,348 | 6/1936 | Dreyfus | 425/71 |
| 2,344,603 | 3/1944 | Czapek | 425/71 |
| 2,962,766 | 12/1960 | Hinkle et al. | 425/70 |
| 3,207,828 | 9/1965 | Petersen et al. | 425/71 |
| 3,824,049 | 7/1974 | Schindler | 425/71 |
| 4,386,897 | 6/1983 | Hungerford | 425/71 |
| 4,911,874 | 3/1990 | Peiffer et al. | 427/71 |
| 4,917,844 | 4/1990 | Komai et al. | 425/72.1 |
| 5,049,223 | 9/1991 | Dais et al. | 264/178 R |
| 5,318,648 | 6/1994 | Heyes et al. | 264/280 |

FOREIGN PATENT DOCUMENTS

| | | |
|---|---|---|
| 0172924 | 3/1989 | European Pat. Off. . |
| 3635302 | 4/1988 | Germany . |
| 62-138225 | 6/1987 | Japan . |
| 03180317 | 8/1991 | Japan . |

*Primary Examiner*—Harold Pyon
*Assistant Examiner*—Joseph Leyson
*Attorney, Agent, or Firm*—W. F. Fasse; W. G. Fasse

[57] ABSTRACT

The cooling of extruded melt film is improved by passing the film sequentially through two cooling baths one arranged above the other. A cooling roller is rotatably mounted in a first lower bath and passes with its cylindrical wall through a second upper bath communicating with the first bath in such a way that a cooling medium level in the second bath is maintained at a higher elevation than a cooling medium level in the first bath that has a discharge positioned at an elevation for maintaining a desired cooling medium level in the first bath.

12 Claims, 2 Drawing Sheets

APPARATUS FOR COOLING EXTRUDED MELT FILM

FIELD OF THE INVENTION

The invention relates to an apparatus for cooling extruded melt film in a sheet or film producing system in which the film is extruded by a sheet die or nozzle onto a cooling roller in a cooling bath.

BACKGROUND INFORMATION

German Patent Publication DE 3,635,302 A1 (Dietz et al.), published on Apr. 28, 1988, discloses a cooling system for extruded melt film in which two separate baths holding cooling liquid are arranged in series so that the film first passes through a first bath in which a cooling roller rotates and then through a second bath through which the film is guided by a plurality of guide rollers. Each bath has a separate cooling liquid circulation system. The liquid level in both baths is substantially the same. In another embodiment the two bath containers communicate with each other, but the water level is still the same in both containers. Nozzles may supply the cooling medium, normally water, into the first bath container in which the outwardly facing surface of the melt film is cooled. In the second bath both surfaces of the melt film are being cooled.

The structure of the cooling bath in German Patent Publication DE 3,635,302 A1 is such that the extruded film initially, that is immediately after its contact with the cooling roller, is only inadequately cooled until the film immerses into the first bath. This feature makes it difficult to intensively cool the film near the extrusion area so that it will have a low stretchability that is required for further treatment of the film. For that reason the above mentioned second bath is arranged downstream of the first bath as viewed in the feed advance direction of the film. The sequential arrangement of two baths is considered to be a disadvantage because it takes up substantial floor space in the feed advance direction of the film.

In cooling systems of this type it is customary to distinguish between systems in which the bearings or mountings for the cooling roller are mounted above the water level in the respective bath and other systems in which the bearings or mountings for the cooling roller are immersed below the water level in the respective bath. The aim of the second type of mounting is to achieve a maximum cooling efficiency with a cooling roller that has a diameter as small as possible. The efficiency of the cooling effect increases the deeper the cooling roller is immersed in the water, because the melt film is contacted by the cooling water quickly after its exit from the die or nozzle. As a result, more melt film can be supplied to further treatment in a film producing system, thereby increasing the efficiency or throughput of the entire system in terms of thermoplastic film length produced per time unit.

The water level in the two baths according to German Patent Publication DE 3,635,302 A1, however, cannot be increased as much as would be desirable under the given geometrical conditions of the two baths arranged in series with each other. Further, so-called air doctor blades are necessary to clean the cooling roller surface to make it ready again for receiving melt film and for squeezing the melt film against the cooling roller in order to avoid air inclusions between the melt film and the cooling roller. Such air doctor blades comprise one or more air nozzles that direct a shaped airstream against the cooling roller and/or against the film surface. Normally, there is sufficient space for positioning air doctor blades for squeezing the melt film against the surface of the cooling roller. However, space for placing cleaning elements including air drying nozzles is limited to the area or sector of the cooling roller surface between the extrusion nozzle and the film take-up roller. Yet, it is necessary to clean and dry the cooling roller surface in the just described area upstream of the nozzle and downstream of the take-up roller to remove any remaining water and to dry the cooling roller surface for receiving melt film. These additional cleaning and drying components also require a certain space for their installation relative to the cooling roller. For an efficient cooling the area in question should be kept as small as possible so that as much cooling roller surface as possible can be immersed in the cooling water. These two requirements, namely providing enough mounting space for cleaning and drying elements and simultaneously an optimal roller immersion are in conflict with each other, because for an efficient cooling one wants to make the looping angle of the melt film around the cooling roller surface as large as possible, while for the cleaning purpose one would like to increase the roller surface area not covered by melt film to properly position the respective cleaning and drying components such as blow nozzles and squeegees including squeegee rollers for first removing most of the water from the cooling roller surface and then drying that surface with a high pressure airstream that blows any remaining water off the surface, preferably laterally, so that no water comes into the area near the extrusion nozzle.

A relative efficient water removal from the surface of the cooling roller is achieved when that surface encloses with the horizontal a relatively large inclination angle which is the case for surface portions away from the nozzle. The angle gets smaller the closer a particular roller surface area approaches the nozzle position. When the inclination angle is large, entrained water tends to flow back by gravity into the bath. However, when the cooling roller is immersed into the cooling bath to a point above the roller center axis, the sector that remains available for cleaning becomes rather small and the inclination also becomes small, which makes it more difficult to clean and dry the roller surface area between the die or nozzle and the film take-up roller. This problem is aggravated when the cooling roller rotates with substantial r.p.m.s because more water is entrained and its removal becomes more difficult. The entraining of water onto the surface of the cooling roller becomes even more pronounced the smaller the above mentioned inclination angle is. Thus, it would be advantageous to have a substantial inclination angle in the surface sector where the cleaning of the roller surface must take place. The larger that sector becomes, the more room there is for the installation of cleaning and drying components.

European Patent Publication EP 0,172,924 B1 (Kobayashi et al.), published on Mar. 5, 1986 discloses a sheet forming apparatus in which first and second cooling rollers are arranged above a cooling bath. The position of the second cooling roller determines the looping or wrap angle of the film around the first cooling roller. The film then travels through a cooling liquid bath. Guide rollers submersed in the cooling liquid guide the film through the bath downstream of the two cooling rollers. Such a structure does not provide the desired intensive cooling of the film immediately after its extrusion, especially the outer surface of the film, even though the inner surface of the film that contacts the cooling roller may be sufficiently cooled. Thus, a film cooling nozzle is positioned near the nozzle. The second cooling roller that determines with its position the looping angle, starts cooling the outer surface of the film after the film has travelled through the looping angle. Still, a water bath is also required downstream of the two cooling rollers for cooling the film into a condition with a low stretchability suitable for further treatment of the film.

U.S. Pat. No. 5,049,223 (Dais et al.) relates to the use of surface active agents for improved cooling of thermoplastic film webs. U.S. Pat. No. 5,318,648 (Heyes et al.) discloses laminating polyester film onto a metal substrate.

The above prior art leaves room for improvement, especially with regard to a compact arrangement of different baths.

OBJECTS OF THE INVENTION

In view of the above it is the aim of the invention to achieve the following objects singly or in combination:

- to achieve a deep roller immersion where it is needed, while avoiding such deep immersion of the cooling roller in a roller surface sector which should be free for cleaning and drying;
- to cool both sides of the melt film substantially immediately downstream of the extrusion nozzle to achieve an optimal cooling effect on both sides of the melt film;
- to achieve an efficient cooling while simultaneously optimally reducing the travel time of the melt film in contact with the cooling roller surface;
- to to provide a compact construction of the film cooling system by avoiding horizontally displaced serially arranged cooling devices; and
- to permit an efficient flow of cooling liquid from one bath into another while maintaining a different liquid level in each bath.

SUMMARY OF THE INVENTION

According to the invention there is provided an apparatus for cooling melt film extruded through a sheet die, comprising a first lower cooling medium bath for holding cooling medium at a first level in said first bath, a single cooling roller rotatably mounted in said first bath, and a second upper bath positioned for cooperation with said single cooling roller and for maintaining a second cooling medium level in said second upper bath higher than said first cooling medium level, whereby the single cooling roller passes with its surface first through the upper bath and then through the lower bath and through the upper bath.

It is an advantage of the invention that the single cooling roller can be immersed with its mountings or bearings below the water level in a lower first bath while still providing a substantial roller sector surface for cleaning the surface of the single cooling roller upstream of the die or nozzle while simultaneously achieving an efficient cooling effect. Another advantage is seen in that a looping angle around the cooling roller can exceed 180° in the lower bath and can even be about 270° in both baths.

The cooling bath, such as a water bath, is so arranged that the surface to be cleaned has a sufficient inclination angle for the efficient removal of entrained water from the surface of the cooling roller while also providing space for the arrangement of drying nozzles or the like.

Further, by arranging a second upper bath upstream of the first lower bath, the second bath can cool the outer surface of the film immediately downstream of the nozzle. The second upper bath is a trough with an open side facing the cooling single roller which thus serves as a moving wall of the cooling trough, whereby side walls of the cooling trough reach over end surfaces of the cooling roller. The second upper bath or trough is filled with a cooling liquid such as water and has a controllable valve, preferably in its bottom wall so that water from the trough can flow by gravity into the first lower bath in a controlled manner to maintain the higher water level in the trough compared to the lower water level in the first lower bath. The arrangement is such that the water level in the trough forming the second upper bath can be maintained substantially above the water level of the first lower bath, wherein the water level is controlled by a flow-out or discharge. Thus, the cooling roller and the second bath can effectively cool both film surfaces immediately as the film is extruded from the nozzle.

BRIEF DESCRIPTION OF THE DRAWINGS

In order that the invention may be clearly understood, it will now be described, by way of example, with reference to the drawings, wherein.

DETAILED DESCRIPTION OF PREFERRED EXAMPLE EMBODIMENTS AND OF THE BEST MODE OF THE INVENTION

Figure 1:
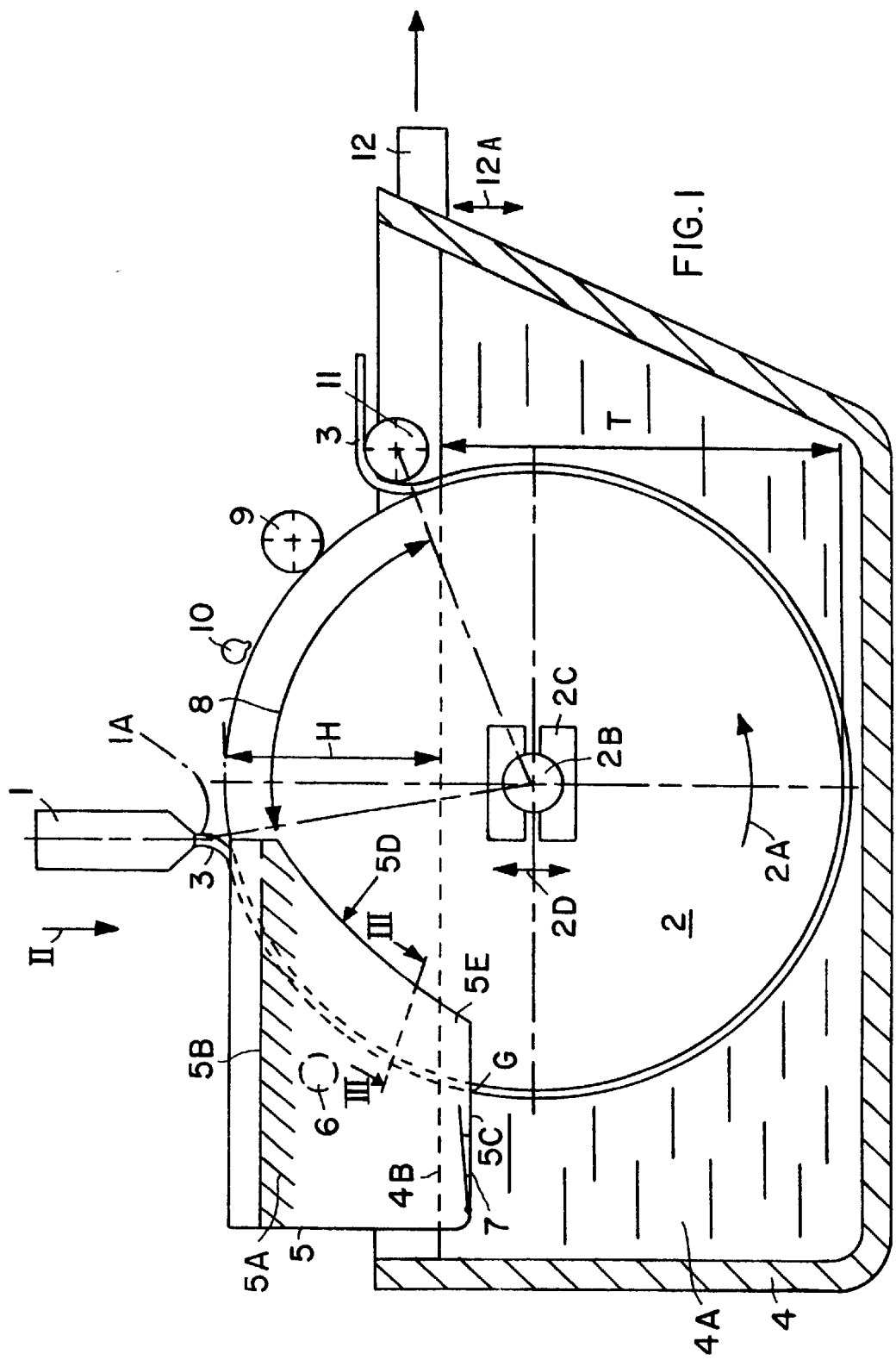
FIG. 1 is a side view, partially in section, of a double bath cooling system according to the invention with one bath positioned above the other.

FIG. 1 shows a nozzle 1 that has a nozzle opening 1A for extruding a melt film 3 directly onto a cylindrical surface of a cooling roller 2 rotating counterclockwise as indicated by the arrow 2A. The cooling roller 2 is mounted for rotation with its shaft 2B in bearings 2C in a first lower bath container 4 holding a cooling liquid 4A at a level 4B. Preferably, the position of the bearings 2C is adjustable up or down as indicated by the arrow 2D. The level 4B is maintained by a cooling liquid discharge 12. The elevational position of the discharge is preferably adjustable as indicated by the vertical double arrow 12A.

According to the invention a second upper bath container 5 holding a cooling liquid 5A at a level 5B is positioned above the first bath container 4. The container 5 of the second upper bath has a bottom 5C which extends partially below the level 4B in the first lower bath 4. The second bath container 5 also has a cooling liquid inlet 6 connected, for example through a hose to a cooling liquid source such as water not shown. A valve, such as a flap valve 7, is positioned in the bottom 5C of the second bath container 5 so that the transfer of cooling liquid from the upper bath container 5 into the lower bath container 4 can be controlled in a manner to maintain the liquid level 5B above the liquid level 4B. The container 5 has an open side 5D flanked by end walls 5E and 5F. The cooperation of these end walls 5E and 5F with the end walls 2E and 2F of the cooling roller 2 will be described in more detail below with reference to FIGS. 2 and 3.

The water level 5B in the second bath container 5 may be maintained by either controlling the water inlet 6 or the valve 7 or both. It is important in this respect that the supply of cooling medium and the discharge of cooling medium are balanced relative to each other to maintain both levels 4B and 5B.

The single cooling roller has a cleaning sector 8 between the nozzle 1 and a film take-up or peel-off roller 11. In this sector 8 elements 9 and 10 are positioned for cleaning and drying the roller surface between the take up roller 11 and the nozzle 1. The element 9 is, for example a squeegee roller, while the element 10 is, for example, an air doctor blade including one or more nozzles that direct a shaped airstream onto the outer cylindrical surface of the roller 2 for cleaning and drying that surface prior to its being covered again by the film 3 exiting from the nozzle 1. The just described arrangement is substantially more compact than has been possible in the prior art. Moreover, the present arrangement can be retrofitted in existing melt film producing machines.

Referring further to FIG. 1, the height H between the top of the roller 2 and the water level 4B can be adjusted in several ways. One way that has been mentioned above involves the vertical repositioning of the discharge port 12 in the first bath container 4 as indicated by the arrow 12A. Such a change will simultaneously change the immersion depth T. Another possibility involves varying or changing the elevational position of the mounting bearings 2C for the roller shaft 2B as indicated by the arrow 2D as mentioned above. The vertical position of the take-up roller 11 may be advantageous in conjunction with either the adjustment of the discharge 12 or the mounting bearings 2C. FIG. 1 also shows a gap G between the bottom 5C of the container 5 and the cylindrical surface of the roller 2. The width of this gap G, is just sufficient for the film 3 to pass through the gap while the film 3 is being cooled.

The above described features and as shown in FIG. 1 make sure that melt film 3 loops around the single cooling roller 2 by more than 180° in the lower bath 4 and by about 270° in both baths 4, 5 together.

FIG. 1 also shows that the extrusion nozzle 1 is positioned next to the second upper bath 5 so that the extruded film 3 first enters the second upper bath 5 before entering into the first lower bath 4.

Figure 2:
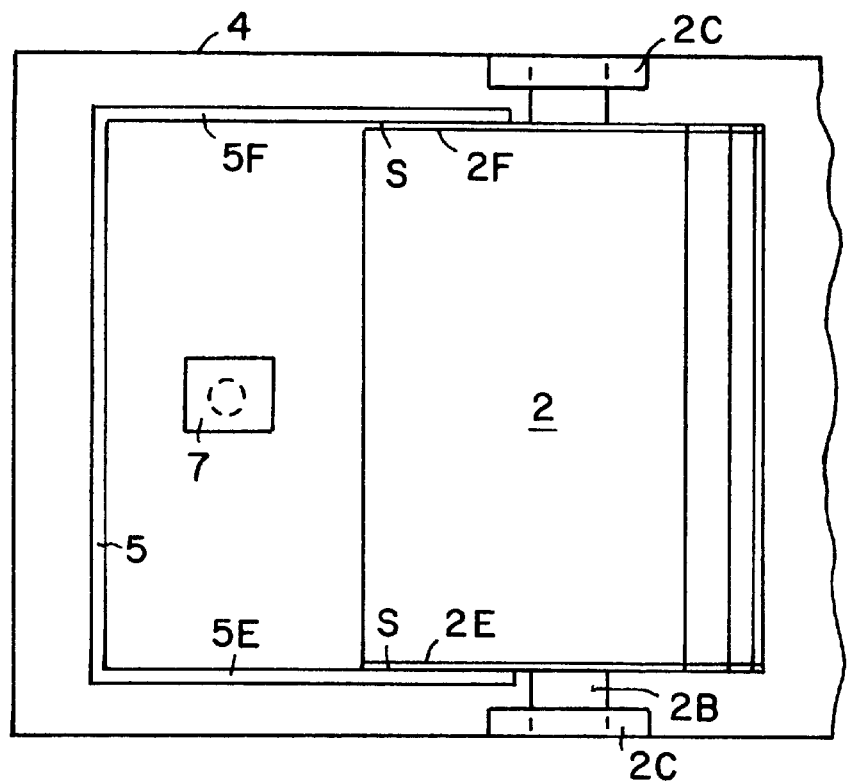
FIG. 2 is a view, partially broken away, in the direction of the arrow II in FIG. 1.

FIG. 2 shows a view in the direction of the arrow II in FIG. 1 and illustrates how the end walls 5E and 5F of the second bath container or trough 5 overlap the end walls 2E and 2F of the roller 2. A seal S is preferably positioned between the two walls 5E, 2E and 5F, 2F. The seals permit rotation of the roller 2 relative to the walls 5E, 5F.

Figure 3:
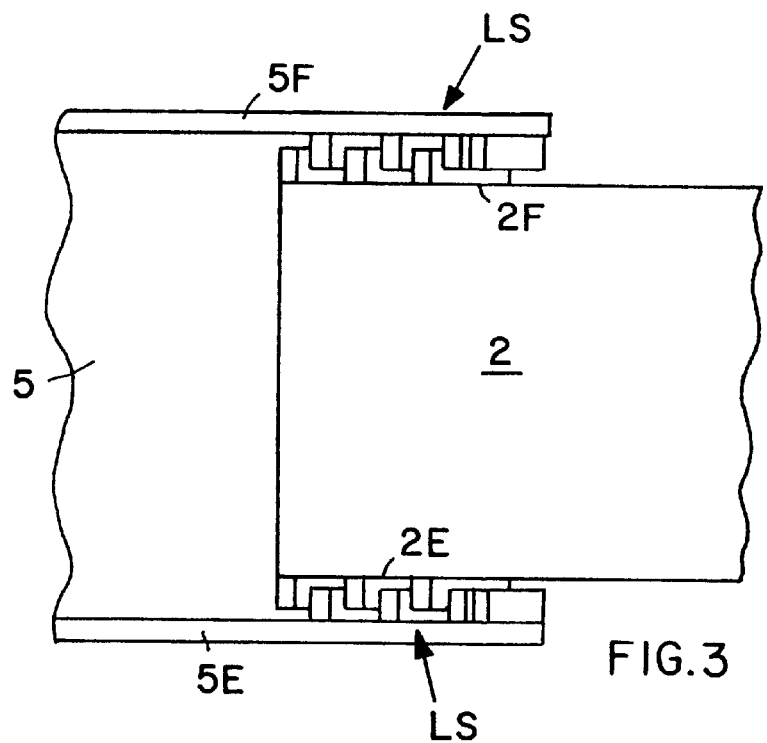
FIG. 3 is a sectional view along section line III—III in FIG. 1.

FIG. 3 shows labyrinth seals LS attached to the roller facing surfaces of the end walls 5E and 5F of the bath container 5 and also attached to the end walls 2E and 2F of the roller 2. Such seals as such are conventional and provide substantially a contactless seal for the second bath container 5 along its open side so that the roller 2 forms a moving wall of one side of the container 5 leaving the gap G shown in FIG. 1 open until film 3 passes through the gap. An initial leakage is acceptable. All labyrinth seals have radii of curvature with their origins in the rotational axis of the shaft 2B of the roller 2.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for cooling melt film extruded through a extrusion nozzle (1), comprising a first bath container forming a first lower bath (4) for holding cooling medium (4A) at a first level (4B) in said first lower bath, a single cooling roller (2) rotatably mounted in said first lower bath, and a second bath container forming a second upper bath (5) positioned for cooperation with said single cooling roller (2) above said first lower bath, said second bath container maintaining a second cooling medium level (5B) in said second upper bath (5) higher than said first cooling medium level (4B), whereby said single cooling roller (2) passes with its surface through said upper bath (5) and then through said lower bath (4).

2. The apparatus of claim 1, wherein said first lower bath (4) has a cooling medium discharge (12) positioned at an elevation for maintaining said first level (4B), and wherein said second upper bath (5) has a cooling medium inlet (6) for feeding cooling medium into said second upper bath and a cooling medium outlet (7) communicating with said first lower bath (4) for a flow from said inlet (6) through said second upper bath into said first lower baths and to said cooling medium discharge (12).

3. The apparatus of claim 1, comprising a take-up roller (11) positioned for separating said film from said single cooling roller, wherein said single cooling roller (2) comprises a cleaning sector (8) positioned between said extrusion nozzle (1) and said take-up roller (11), and further comprising at least one roller cleaning element positioned for cleaning a surface of said cooling roller (2) along said cleaning sector (8).

4. The apparatus of claim 3, wherein said at least one cleaning element is an air doctor blade or a squeegee.

5. The apparatus of claim 3, further including means for changing the emersion height (H) or the immersion depth (T) of said cooling roller (2) in said first bath to vary an angular extent of said cleaning sector.

6. The apparatus of claim 3, further comprising means for changing the position of said take-up roller (11) to vary an angular extent of said cleaning sector.

7. The apparatus of claim 1, wherein said single cooling roller has a cylindrical outer wall and two end walls, said second upper bath (5) comprising an open side facing said cylindrical outer wall of said cooling roller, said second upper bath further comprising lateral walls reaching over said end walls of said cooling roller so that said cylindrical outer wall of said cooling roller forms a wall of said second bath to close said open side.

8. The apparatus of claim 7, wherein said second upper bath has a bottom wall (5C) spaced from said cylindrical outer wall of said single cooling roller to form a gap (G) between said bottom wall (5C) and said cylindrical outer wall of said single cooling roller, said gap (G) having a width sufficient for said melt film to pass through said gap.

9. The apparatus of claim 7, further comprising seals between said lateral walls of said second upper bath and said end walls of said single cooling roller.

10. The apparatus of claim 9, wherein said seals are labyrinth seals.

11. The apparatus of claim 1, wherein said single cooling roller (2) comprises a looping angle of said melt film in said lower bath (4) of more than 180°, and of about 270° in said lower bath (4) and said upper bath (5) together.

12. The apparatus of claim 1, wherein said sheet die (1) is positioned next to said second upper bath (5) so that an extruded film (3) enters said second upper bath (5) before entering said first lower bath (4).

* * * * *

UNITED STATES PATENT AND TRADEMARK OFFICE
CERTIFICATE OF CORRECTION

PATENT NO. : 6,036,465
DATED : March 14, 2000
INVENTOR(S) : Rutz et al.

It is certified that error appears in the above-identified patent and that said Letters Patent is hereby corrected as shown below:

Column 3, line 26, before "provide" delete --to--;
Column 3, line 45, after "lower bath" delete --and through the upper bath--;
Column 3, line 65, before "roller" replace "cooling single" by --single cooling--;
Column 4, line 32, before "cooling roller" insert --single--;
Column 4, line 45, after "bottom" replace "SC" by --5C--;
Column 5, line 22, after "bearings 2C." please enter a paragraph.

Signed and Sealed this

Sixth Day of February, 2001

Attest:

Attesting Officer

Q. TODD DICKINSON

Director of Patents and Trademarks